United States Patent [19]

Sasaki

[11] Patent Number: 5,577,960
[45] Date of Patent: Nov. 26, 1996

[54] IMAGE SYNTHESIZING SYSTEM AND GAME PLAYING APPARATUS USING THE SAME

[75] Inventor: Kenji Sasaki, Tokyo, Japan

[73] Assignee: Namco, Ltd., Tokyo, Japan

[21] Appl. No.: 379,679

[22] PCT Filed: Jun. 10, 1994

[86] PCT No.: PCT/JP94/00943

§ 371 Date: Jun. 26, 1995

§ 102(e) Date: Jun. 26, 1995

[87] PCT Pub. No.: WO94/29813

PCT Pub. Date: Dec. 22, 1994

[30] Foreign Application Priority Data

Jun. 10, 1993 [JP] Japan ................................. 5-166495

[51] Int. Cl.⁶ .................................................. A63F 9/24
[52] U.S. Cl. ................................ 463/32; 463/31; 395/128
[58] Field of Search .................................. 395/152, 130, 395/128, 125, 122; 463/32, 31

[56] References Cited

U.S. PATENT DOCUMENTS

| | | | |
|---|---|---|---|
| 4,213,252 | 7/1980 | Sullivan et al. | 395/130 X |
| 4,343,037 | 8/1982 | Bolton | 395/125 X |
| 4,615,013 | 9/1986 | Yan et al. | 395/130 |
| 4,692,880 | 9/1987 | Merz et al. | 395/130 |
| 4,727,365 | 2/1988 | Bunker et al. | |
| 4,821,212 | 4/1989 | Heartz | 395/125 X |
| 4,827,252 | 5/1989 | Busbridge et al. | 395/125 X |
| 4,845,651 | 7/1989 | Aizawa et al. | 395/125 |
| 4,953,107 | 8/1989 | Hedley et al. | 395/152 X |
| 4,994,989 | 2/1991 | Usami et al. | 395/120 |
| 5,222,204 | 6/1993 | Swanson | 395/127 |
| 5,224,208 | 6/1993 | Miller, Jr. et al. | 395/125 |
| 5,261,041 | 11/1993 | Susman | 395/152 |
| 5,317,689 | 5/1994 | Nack et al. | 395/163 |
| 5,359,526 | 10/1994 | Whittington et al. | |
| 5,469,535 | 11/1995 | Jaivis et al. | 395/130 |

FOREIGN PATENT DOCUMENTS

| | | |
|---|---|---|
| 1-205277 | 8/1989 | Japan . |
| 3-268186 | 11/1991 | Japan . |
| 4-238587 | 8/1992 | Japan . |

OTHER PUBLICATIONS

"Illustrated Computer Graphics," *Computer Graphics User's Guide*, Sep. 1985, pp. 97–106.

*Primary Examiner*—Jessica Harrison
*Assistant Examiner*—Michael O'Neill
*Attorney, Agent, or Firm*—Oliff & Berridge

[57] ABSTRACT

A real-time display type image synthesizing system which can display a 3-D object with less polygons and with high resolution is provided.

The 3-D object data is stored in a 3-D object data storage unit 26 as shape models having different degrees of precision. The closer the 3-D object is to the view point in the view-point coordinate system, the object data of the shape model of higher precision is read out.

Texture information applied to each polygon in each of the shape models is stored in a texture information storage unit 32 as image information of different resolution for every shape model and for every polygon in the shape models.

An image forming unit 34 maps the texture information of precision corresponding to each polygon in the 3-D object perspectively projected and output by a 3-D calculation unit 22 onto the respective polygons to synthesize and display an image on a display 40.

18 Claims, 11 Drawing Sheets

FOR CLOSE-UP

APPROXIMATELY 200~300 POLYGONS

FIG. 4B

FOR MIDDLE-RANGE

APPROXIMATELY 20~30 POLYGONS

FIG. 4C

FOR LONG-SHOT

6 POLYGONS

IMAGE SYNTHESIZING SYSTEM AND GAME PLAYING APPARATUS USING THE SAME

TECHNICAL FIELD

The present invention relates to an image synthesizing system using the texture mapping technique and a game playing apparatus using such an image synthesizing system.

BACKGROUND ART

Conventionally, an image synthesizing system for synthesizing a pseudo three-dimensional (3-D) image through a computer graphic technique is known. Such an image synthesizing system is broadly used as in various video games, airplane and other vehicle maneuvering simulators.

Figure 12:
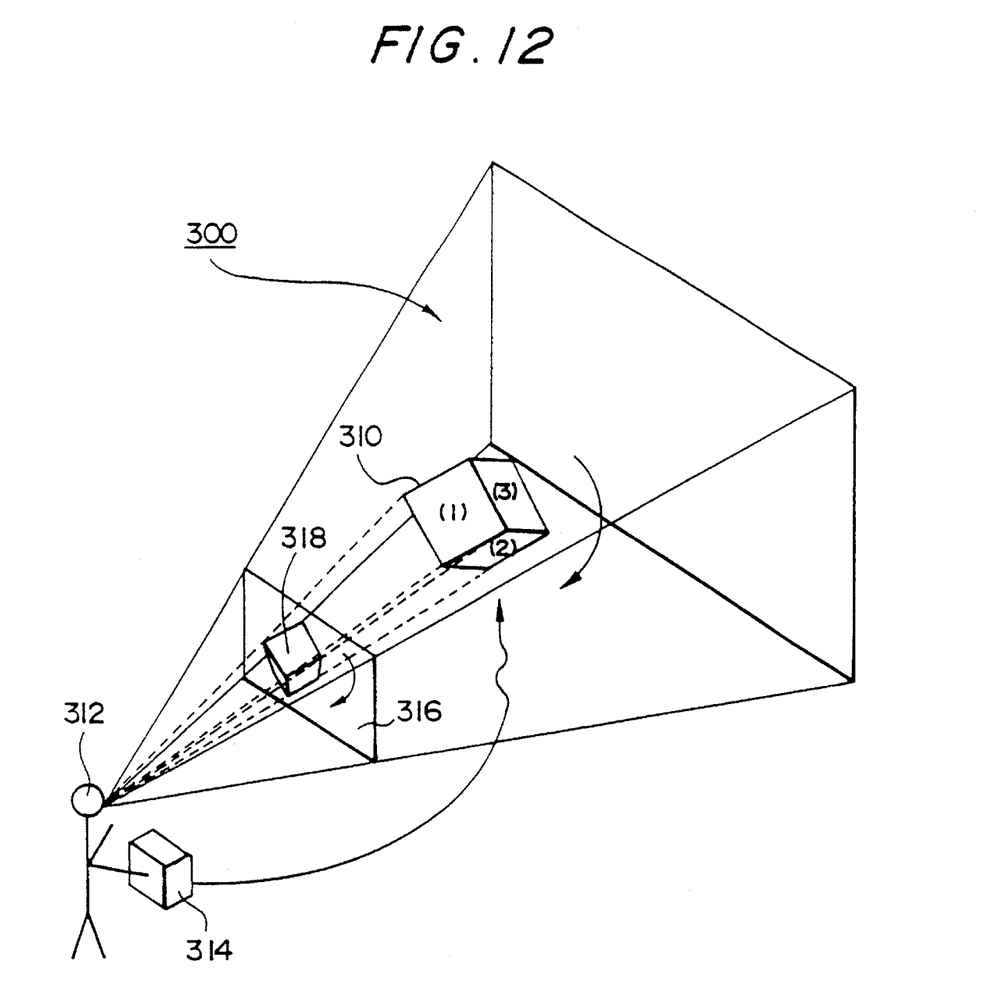
FIG. 12 illustrates the principle of a conventional image synthesizing system.

FIG. 12 shows the principle of such an image synthesizing system. The image synthesizing system previously stores image information relating to a 3-D object 310 in a virtual 3-D space 300. The image information relating to the 3-D object 310 previously stored in a memory as a shape model comprises a plurality of polygons (1) to (6) (polygons (4) to (6) are not shown).

If the image synthesizing system is used in a driving game, the 3-D object 310 may be in the form of a racing car which moves in the virtual 3-D space 300 while competing with a player's car or in the form of a stationary matter such as a road, house or the like which is disposed in the virtual 3-D space.

When a steering wheel or the like in a control panel 314 is maneuvered by a player 312, the view point of a driver (player) which is set in the virtual 3-D space 300 corresponding to the player's car is varied in position and direction. 3-D objects representing the racing car competing with the player's car and the surrounding matters are perspectively projected on a perspective projection screen 316 of view-point coordinate system and displayed as a pseudo 3-D image 318. Thus, the 3-D objects including the racing car and other matters can be rotated and translated in real time by the player 312 to perform a simulation in the virtual 3-D space while viewing it from the driver (player).

Figure 3:
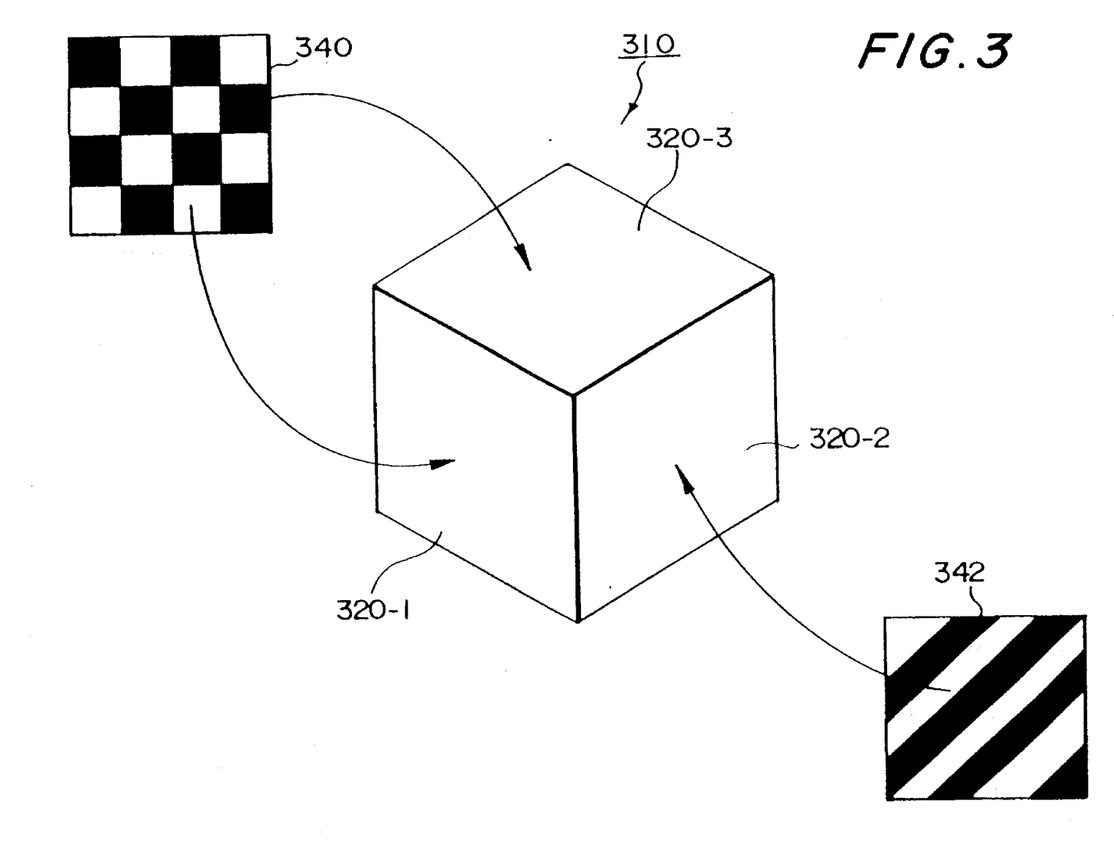
FIG. 3 is a view illustrating the principle of a texture mapping in the image synthesizing system of the embodiment.

There is also known an improved image synthesizing system using a so-called texture mapping technique. As shown in FIG. 3, such an image synthesizing system separates image information relating to a 3-D object 310 represented as a shape model which comprises in combination with a plurality of polygons and graphic information to be applied to the polygons forming the shape model (hereinafter called "texture information") and stores the shape model and the graphic information. When an image is output, texture data 340, 342 are applied to the respective polygons to synthesize the image.

According to such a texture mapping technique, the patterns and colors of a graphic can be processed intricately without increasing the number of polygons to be processed.

It is desirable that such a real-time display type image synthesizing system can synthesize a high-quality image while reducing the burden on the hardware.

However, the image synthesizing system of the prior art has the following problems.

First Problem

As for the image synthesizing system of the prior art, if the quality of a graphic is to be improved, the amount of data processed by the hardware increases, and the number of objects displayed per scene is limited.

In the driving game, for example, vehicles running on a road, buildings arranged along the road and other scenery may be displayed as 3-D objects. Each of these 3-D objects is formed as a shape model which comprises in combination with a plurality of polygons. To increase the reality in the 3-D objects, the shape model must be represented by more combinations of polygons.

In the computer graphics, however, the processing of polygons provides very high burden on the hardware. Therefore, as the number of polygons required to form one 3-D object multiplies, the burden on the hardware also increases. In displaying the image in real time, number of display objects per scene is so limited that the game scene can end up being monotonous.

Second Problem

In the driving game, a 3-D object may be enlarged partially and displayed as when a car approaches to another car.

In such a case, if the texture data applied to the polygons have normal resolution, the enlarged display 3-D object is extremely degraded, and the reality in the game scene is damaged.

If the texture information for the enlarged display 3-D object has high resolution, the memory capacity for storing the texture data becomes too big, making the entire system costly.

For example, on improving the quality of enlarged display image in an image synthesizing system capable of displaying a racing car on a circuit from various angles, the shape model of a 3-D object representing the racing car must first be formed by a number of polygons and the high-resolution texture information for the polygons is prepared and stored in a memory. This rises the manufacturing cost of the entire system, resulting in an unreasonably expensive image synthesizer for game playing machines.

In view of such problems, an object of the present invention is to provide an image synthesizing system which can form and display a 3-D object with less polygons of high resolution and a game playing apparatus using such an image synthesizing system.

DISCLOSURE OF THE INVENTION

To this end, the present invention provides an image synthesizing system comprising:

3-D space processing means for perspectively projecting a 3-D object representing a shape model formed by a combination of polygons in a virtual 3-D space onto a projection plane of view-point coordinate system;

texture information storage means for previously storing texture information relating to images on the polygons of said 3-D object; and image forming means for reading texture information corresponding to the polygons of said perspectively projected 3-D object from said texture information storage means by mapping said texture information onto the polygons for forming and displaying an image on a display, said 3-D space processing means comprising:

an object data storage unit for storing data of said 3-D object as object data represented by a plurality of shape models having different degrees of precision;

an object data reading unit for selecting object data of a shape model of higher precision as said 3-D object and a view point draw closer to each other and for reading said object data from said object data storage unit; and a 3-D calculation unit for positioning the read 3-D object in a virtual 3-D space and perspectively projecting said 3-D object onto the projection plane of view-point coordinate system, said texture information storage means for storing texture information of each polygon forming respective shape models of different precision based on said shape models having different degrees of precision of said 3-D object, and said image forming means for reading texture information of a shape model of precision corresponding to the polygons of said perspectively projected 3-D object from said texture information storage means by mapping said texture information onto the polygons for synthesizing an image to be displayed.

The present invention also provides a game playing apparatus comprising:

a player's control unit; and an image synthesizing system responsive to input signals from said player's control unit and to a given game program for forming and displaying a game image on a display, said image synthesizing system comprising:

3-D space processing means for perspectively projecting a 3-D object representing a shape model formed by a combination of polygons in a virtual 3-D space onto a projection plane of view-point coordinate system;

texture information storage means for previously storing texture information relating to images on the; polygons of said 3-D object; and image forming means for reading texture information corresponding to the polygons of said perspectively projected 3-D object from said texture information storage means by mapping the texture information onto the polygons for forming and displaying an image on a display, said 3-D space processing means comprising:

an object data storage unit for storing data of said 3-D object as object data represented by a plurality of shape models having different degrees of precision;

an object data reading unit for selecting object data of a shape model of higher precision as said 3-D object and a view point draw closer to each other and for reading said object data from said object data storage unit; and a 3-D calculation unit responsive to the input signals from the player's control unit and to the given game program for calculating a predetermined game and controlling said object data reading unit to read said object data, said 3-D calculation unit being further operative to position the read 3-D object in a virtual 3-D space and perspectively project said 3-D object onto the projection plane of view-point coordinate system, said texture information storage means for storing texture information of each polygon forming respective shape models of different precision based on said shape models having different degrees of precision of said 3-D object, and said image forming means for reading texture information of a shape model of precision corresponding to the polygons of said perspectively projected 3-D object from said texture information storage means by mapping said texture information onto the polygons for synthesizing an image to be displayed.

It is preferred that said texture information storage means stores highly resolute texture information for polygons in an image part requiring high resolution and a shape model of high precision.

It is also preferred that said texture information storage means stores highly resolute texture information for polygons in an image part requiring high resolution.

It is further preferred that said object data storage unit forms and stores an image part requiring high resolution for a shape model of high precision as independent polygons, and wherein said texture information storage means stores highly resolute texture information for polygons in an image part requiring high resolution.

It is further preferred that said object data storage unit stores a predetermined 3-D object as object data represented by shape models for close-up, middle-range and long-shot modes, and wherein said texture information storage means stores highly resolute texture information for polygons in an image part requiring high resolution of said close-up shape model.

It is further preferred that said object data includes vertex texture coordinates set for each vertex in the respective polygons of said shape mode 1, and wherein said image forming means calculates texture coordinates used as texture information read-out addresses for all dots in the polygons from input polygon vertex texture coordinates, the calculated texture coordinates being then used as addresses to read texture information from said texture information storage unit by mapping the read texture information onto the corresponding polygon for forming and displaying an image.

According to the present invention, part or all of the 3-D objects in the 3-D object data stored in the object data storage unit are previously stored as object data representing a plurality of shape models having different degrees of precision. As the view point in the view-point coordinate system and the 3-D object draw closer, the object data represented by a shape model of higher precision is read out.

If the 3-D object is far away from the view point, the 3-D object is displayed as a simple shape model formed by less polygons. Thus, the burden on the hardware can be reduced and it is possible to display more 3-D objects on the display.

Particularly, in a real-time computer graphic system in which the number of polygons to be displayed is limited, objects continuously changing their orientation and distance can be displayed with minimum number of polygons with the technique of the present invention. As a result, the image can be displayed in real time even if a scene requires many more polygons.

In addition, it is preferred that the texture information applied to the polygons each forming a shape model of a 3-D object is stored as image data of different resolution for each shape model and further for each of the polygons forming the shape model, rather than all the texture information having the same resolution.

In other words, the image synthesizing system of the present invention stores the texture information for each of the polygons forming each of the 3-D object shape models which have different degrees of precision.

Among polygons forming a shape model, a polygon representing an image part requiring high resolution is formed to provide texture information of corresponding high resolution. Thus, with a shape model of high precision, the texture information corresponding to all polygons forming such a shape model is stored as information of low resolution when an enlarged display object does not require very high resolution and as information of high resolution when an enlarged display object requires high resolution, rather than all the stored texture information having the same resolution. Therefore, the entire texture data can be compressed such that an image of high resolution can be displayed with little increase in the memory capacity for storing the texture information.

When the present invention is applied to display a 3-D object constantly varying in orientation and distance in the 3-D image space, the memory capacity used in the entire system can be saved more effectively.

By applying the present invention to a game playing apparatus, it is possible to provide an inexpensive game apparatus which can display many 3-D objects.

BEST MODES FOR CARRYING OUT THE INVENTION

The present invention will now be described in detail with reference to the drawings.

Figure 2:
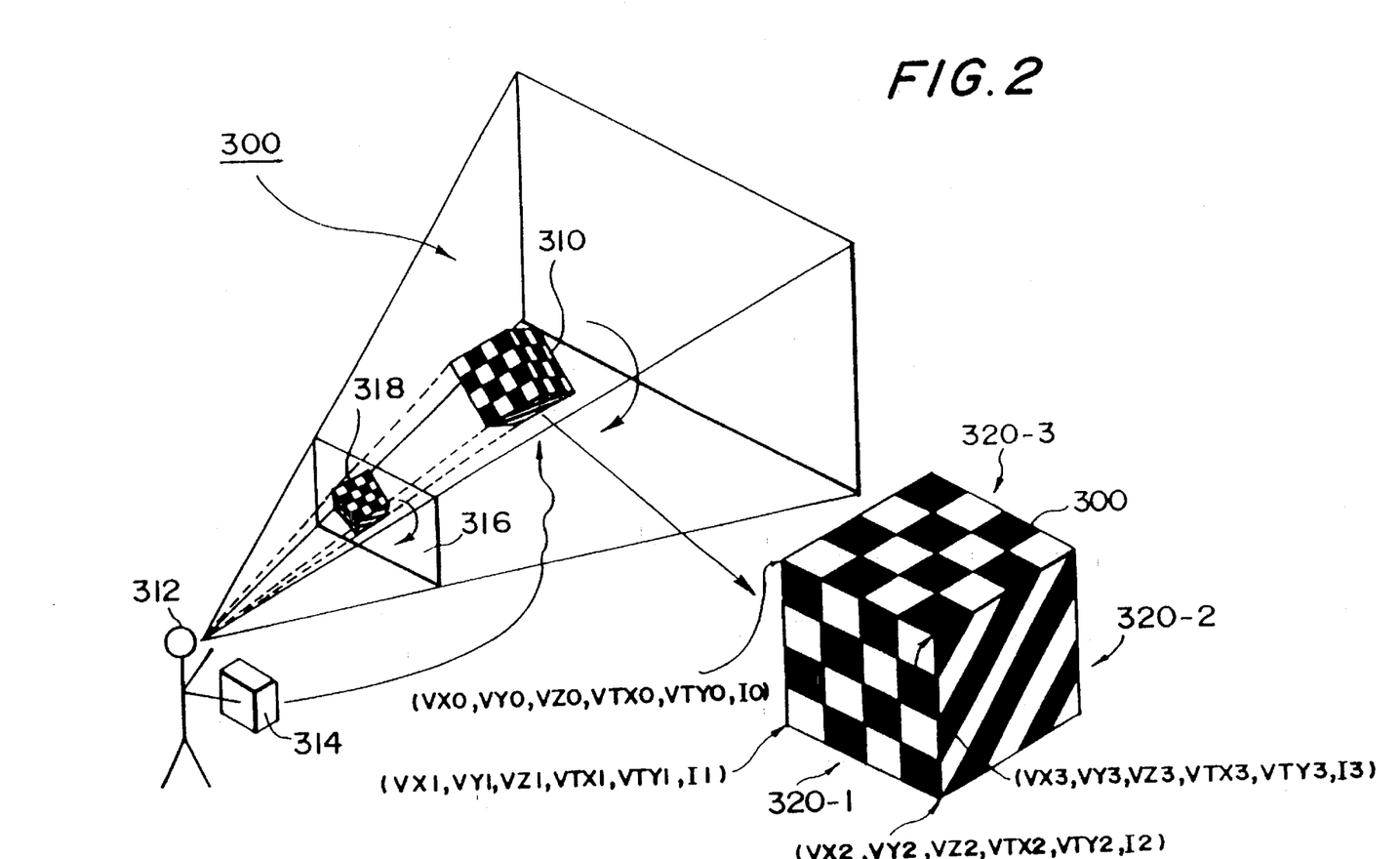
FIG. 2 is a schematic view illustrating the principle of the image synthesizing system using a texture mapping technique.

FIG. 2 shows one preferred embodiment of a real-time display type image synthesizing system constructed in accordance with the present invention, in which parts similar to those of the aforementioned prior art are designated by identical reference numerals.

The image synthesizing system perspectively projects a 3-D object 310 which is represented as a shape model comprising a combination of a plurality of polygons in a virtual 3-D space 300, onto a given perspective projection plane 316 in a view-point coordinate system. Thus, a pseudo 3-D image 318 is displayed on a display.

In such an image synthesis, the image synthesizing system uses a technique known as texture mapping. As shown in FIG. 3, the image information of the 3-D object 310 is separated into image information for respective polygons 320-1, 320-2, 320-3 and so on and graphic information to be applied to the respective polygons (which is called "texture information" hereinafter) and is stored. When an image is to be output, texture information 340 and 342 are applied to the respective corresponding polygons 320-1, 320-2, 320-3 and so on so as to synthesize the image. Such an application of the texture information 340 and 342 is accomplished after the 3-D object 310 is perspectively projected onto the projection plane.

As described, the number of polygons which can be displayed in one second is limited to a certain degree when an image is to be displayed in real time through a 3-D computer graphic system. The present invention is characterized by that the real-time display type computer graphic system having limited number of polygons to be displayed in which a 3-D object continuously varying in orientation and distance can be displayed with less polygons and high resolution.

Figure 1:
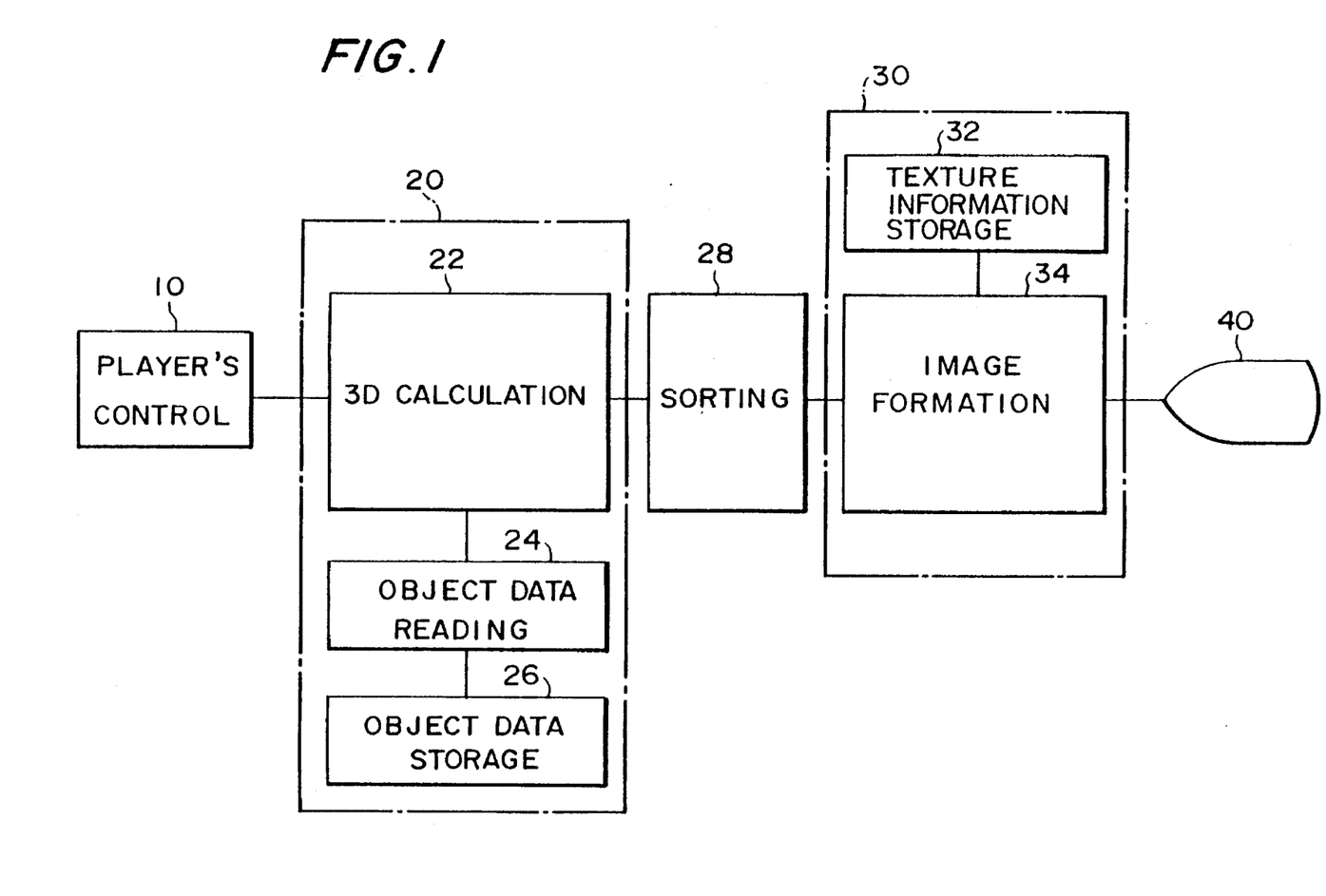
FIG. 1 is a block diagram of an image synthesizing system constructed in accordance with the embodiment of the present invention.

FIG. 1 is a block diagram of an image synthesizing system to which the present invention is applied.

The image synthesizing system comprises a player's control unit 10, a 3-D game space processing unit 20, a sorting unit 28 and an image synthesizing unit 30. The synthesized image is displayed on a display 40.

The player's control unit 10 is located on a control panel 314 so that a player 312 may input various control signals. In a driving game, for example, the player's control unit 10 may include a steering wheel, brake pedal, accelerator pedal and others, all of which are disposed on and near the control panel 31.

The 3-D game space processing unit 20 is responsive to the input signals from the player's control unit 10 and to a previously stored game program for processing a game playing various 3-D objects 310 in a virtual 3-D space 300.

Each of the 3-D objects 310 is represented as a shape model comprising a combination of a plurality of polygons. The 3-D object 310 is perspectively projected onto a perspective projection plane 316 in a moving view-point coordinate system, the information of the perspectively projected 3-D object being then output toward the sorting unit 28.

To accomplish such a processing, the game processing unit 20 comprises a 3-D calculation unit 22, an object data reading unit 24 and an object data storage unit 26.

The object data storage unit 26 stores image information of various 3-D objects represented as shape models each comprising a combination of a plurality of polygons. In this embodiment, particularly, 3-D object data representing racing cars played in various scenes are stored as plural object data represented by a plurality of shape models having different degrees of precision.

Figure 4A:
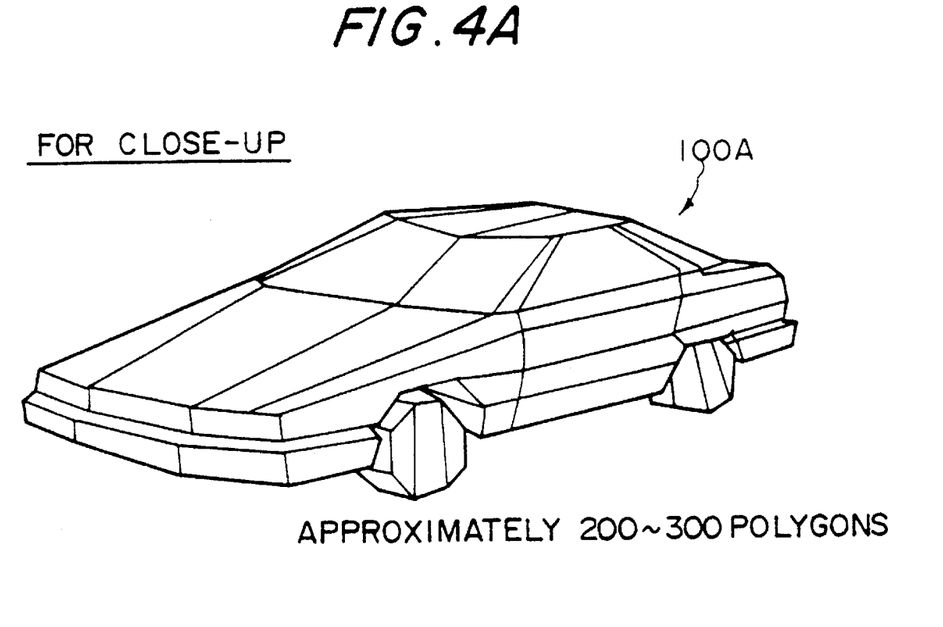
FIGS. 4A, 4B and 4C illustrate various shape models of a 3-D object used in the image synthesizing system of the embodiment.
Figure 4B:
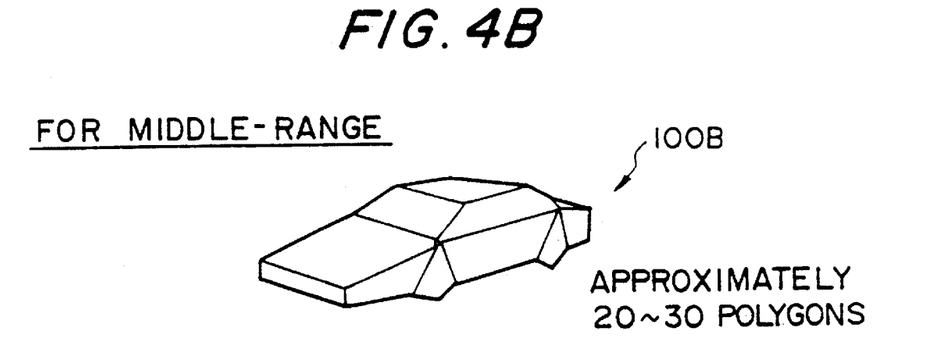
Figure 4C:
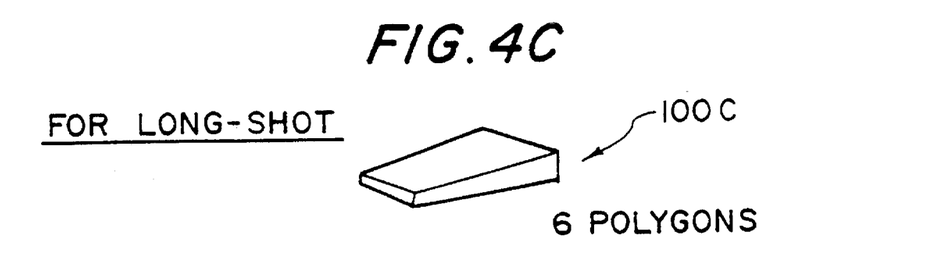

FIGS. 4A, 4B and 4C show shape models of object data of a racing car which is to be stored in the object data storage unit 26. As shown in FIGS. 4A, 4B and 4C, the object data storage unit 26 stores the object data for close-up, middle-range and long-shot modes, respectively.

The close-up object data shown in FIG. 4A represents the details of a racing car as a shape model 100A which is formed by a combination of polygons ranging between 200 and 300.

Figure 5A:
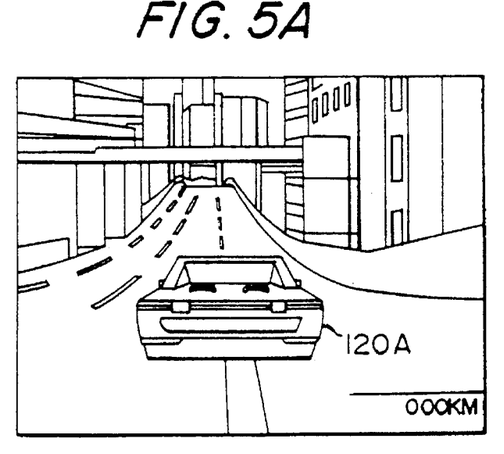
FIGS. 5A, 5B and 5C illustrate game scenes formed by using the shape models of FIGS. 4A, 4B and 4C.

The close-up shape model 100A of the racing car is formed so that it looks natural from all directions since the angles of display is variable, for example, the racing car is displayed in various angles in a close-up position, as shown in FIG. 5A.

Figure 6A:
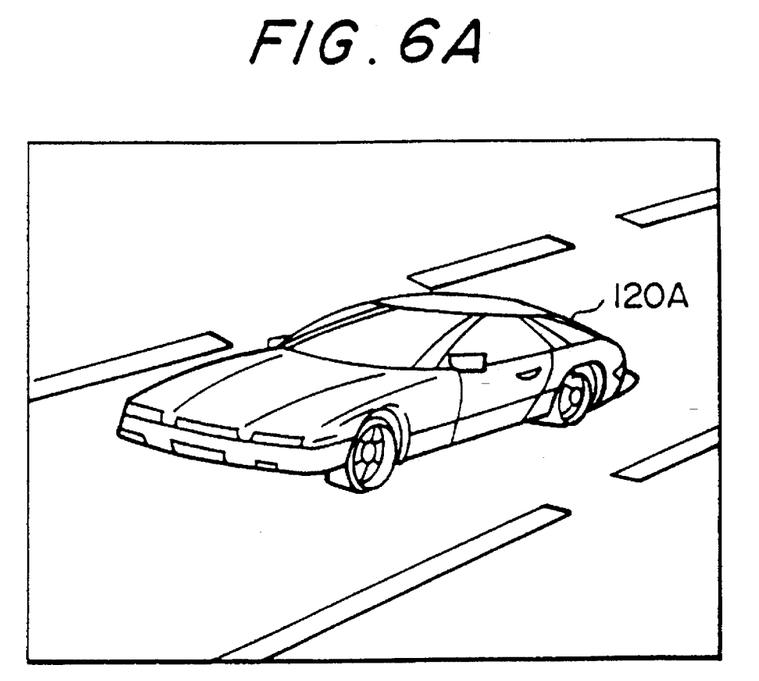
FIGS. 6A and 6B illustrate a close-up game scene formed by the shape models and the enlarged game scene thereof.
Figure 6B:
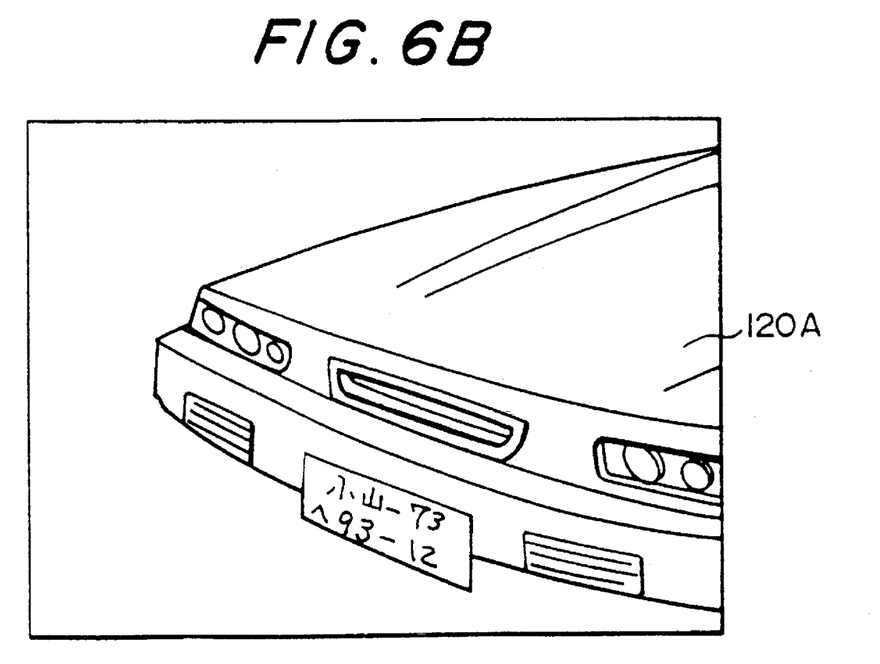

In the close-up mode, particularly, the racing car may be partially enlarged and displayed, as shown in FIG. 6B. In such a case, any painted panel such as bonnet or the like is displayed natural when it is enlarged. However, when parts such as a number plate, head light and others are enlarged, they are displayed unnatural and poor with irregular edges. It is therefore preferred that such parts requiring high resolution are formed separately of other parts when shape models are to be formed.

Figure 5B:
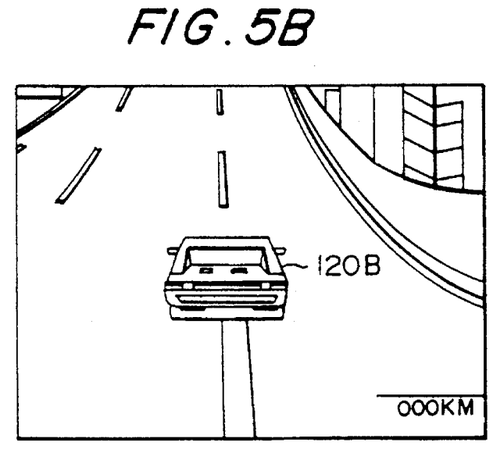
Figure 5C:
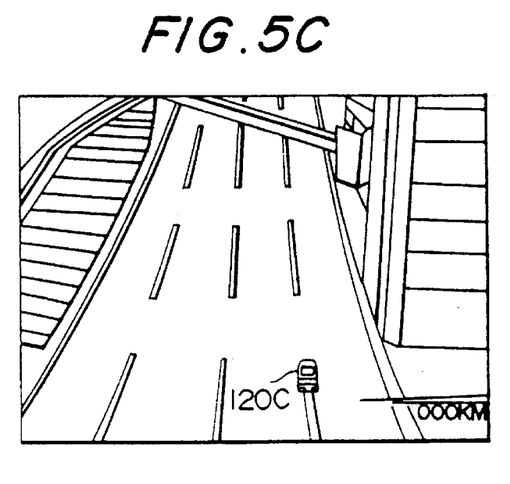

When the racing car is to be displayed relatively far from the view point as shown in FIGS. 5B and 5C, the area which the racing car occupies in the display is progressively reduced. Thus, a middle-range shape model 100B is formed of a combination of 20–30 polygons as shown in FIG. 4B, while a long-shot shape model 100C is formed of a simple hexahedron model comprising a combination of six polygons as shown in FIG. 4C.

The 3-D calculation unit 22 is responsive to the given game program and to the input signals from the player's control unit 10 for performing various game calculations Various 3-D objects such as racing cars, roads, buildings and other matters required to define the driving game are arranged in the virtual 3-D game space 300. 3-D objects to be displayed are specified in the view-point coordinate system. At the same time, the distance between a racing car and the view point is calculated.

The object data reading unit 24 sequentially reads object data calculated by the 3-D calculation unit 22 and to be displayed from the object data storage unit 26, the read object data is then input into the 3-D calculation unit 22. At this point, 3-D object data stored as a plurality of shape models having different degrees of precision (e.g., the aforementioned racing car) are selectively read out depending on the distance between the view point and the 3-D object in either of the close-up, middle-range or long-shot mode.

For example, when such an image as shown in FIG. 5A is to be displayed, the object data formed by such a close-up shape model as shown in FIG. 5A is read out. When such a middle-range or long-shot image as shown in FIG. 5B or 5C is to be displayed, the object data formed by such a middle-range or long-shot shape model as shown in FIG. 4B or 4C will be read out.

The 3-D calculation unit 22 arranges the read 3-D object in the virtual 3-D game space 300, and perspectively projects it onto the perspective projection plane 316 in the view-point coordinate system. The sorting circuit 28 sorts and outputs the information relating to the perspectively projected 3-D object toward the image synthesizing unit 30.

The structural and functional details of the 3-D game space processing unit 20 of the embodiment will be described in connection with texture information written into a texture information storage unit 32 which will be described later.

In the driving game according to this embodiment, image information of 3-D objects 310 representing various game defining components such as racing cars, roads, buildings or the like are stored in the 3-D object data storage unit 26. The image information of these 3-D objects are then subjected to various image processing steps such as coordinate transformation, rotation, translation and so on. Thus, the driving game space 300 being the virtual 3-D game space is formed.

The 3-D game space processing unit 20 causes each polygon (more particularly, each vertex thereof) to be subjected to various processing steps such as coordinate transformations such as rotation, translation, perspective projection and others and clipping. The texture information is processed by the 3-D game space processing unit 20 separately of the polygons. The texture information itself is stored in the texture information storage unit 32 which will be described later. The texture information is specified by giving image information of vertex texture coordinates VTX and VTY to each vertex in each polygon. For example, as shown in FIG. 2, each of the vertices in the polygon 320-1 is previously given vertex texture coordinates (VTX0, VTY0), (VTX1, VTY1), (VTX2, VTY2) and (VTX3, VTY3). These vertex texture coordinates are stored in the 3-D object data storage unit 26.

The 3-D calculation unit 22 is responsive to the given game program and to the input signals from the player's control unit 10 for performing various game processing steps. To form a driving game space 300, for example, various 3-D objects 310 defining such driving game components as racing cars, roads, buildings and so on must be arranged in place in the virtual 3-D game space 300. Therefore, an object number and positional information indicating the position of any specified 3-D object are required, and are calculated by the 3-D calculation unit 22.

For such a particular object, for example, a racing car controlled by the player, the 3-D calculation unit 22 uses the distance between the view point and the object to determine which object data of the close-up, middle-range or long-shot shape model as shown in FIG. 4 should be read out and to output the object number of the read object data.

The object data reading unit 24 reads the image information of the corresponding 3-D object from the 3-D object data storage unit 26 using the object number as address.

The 3-D calculation unit 22 forms object data and polygon data from the data read from the 3-D object data storage unit 26.

The object data is formed by positional data, rotation data and other associated data for 3-D objects such as racing cars and others. The polygon data is formed by data divided from the image information of the racing cars and others and includes polygon vertex coordinates, vertex texture coordinates, brightness information and other associated data. Such data is formatted into a given style.

The 3-D calculation unit 22 uses the player's view point data and the object data to perform various coordinate transformations to the polygon data. In other words, the polygon is subjected to rotation into the local coordinate system, translation into the world coordinate system and rotation into the view-point coordinate system.

After these coordinate transformations, the polygon data is then subjected to clipping. The clipped data is then output toward a subsequent sorting unit 28.

The sorting unit 28 uses the data thus input and sorting data contained in the input data to determine the order of image information of the polygon to be processed in the subsequent image synthesizing unit 30. According to the determined order, the image information of each polygon is output toward the image synthesizing unit 30.

The image synthesizing unit 30 comprises a texture information storage unit 32 which stores the texture information of the respective polygons and an image forming unit 34 for mapping the texture information stored in the texture information storage unit 32 on the respective polygons of the perspectively projected 3-D object so as to form an image to be displayed.

Figure 7:
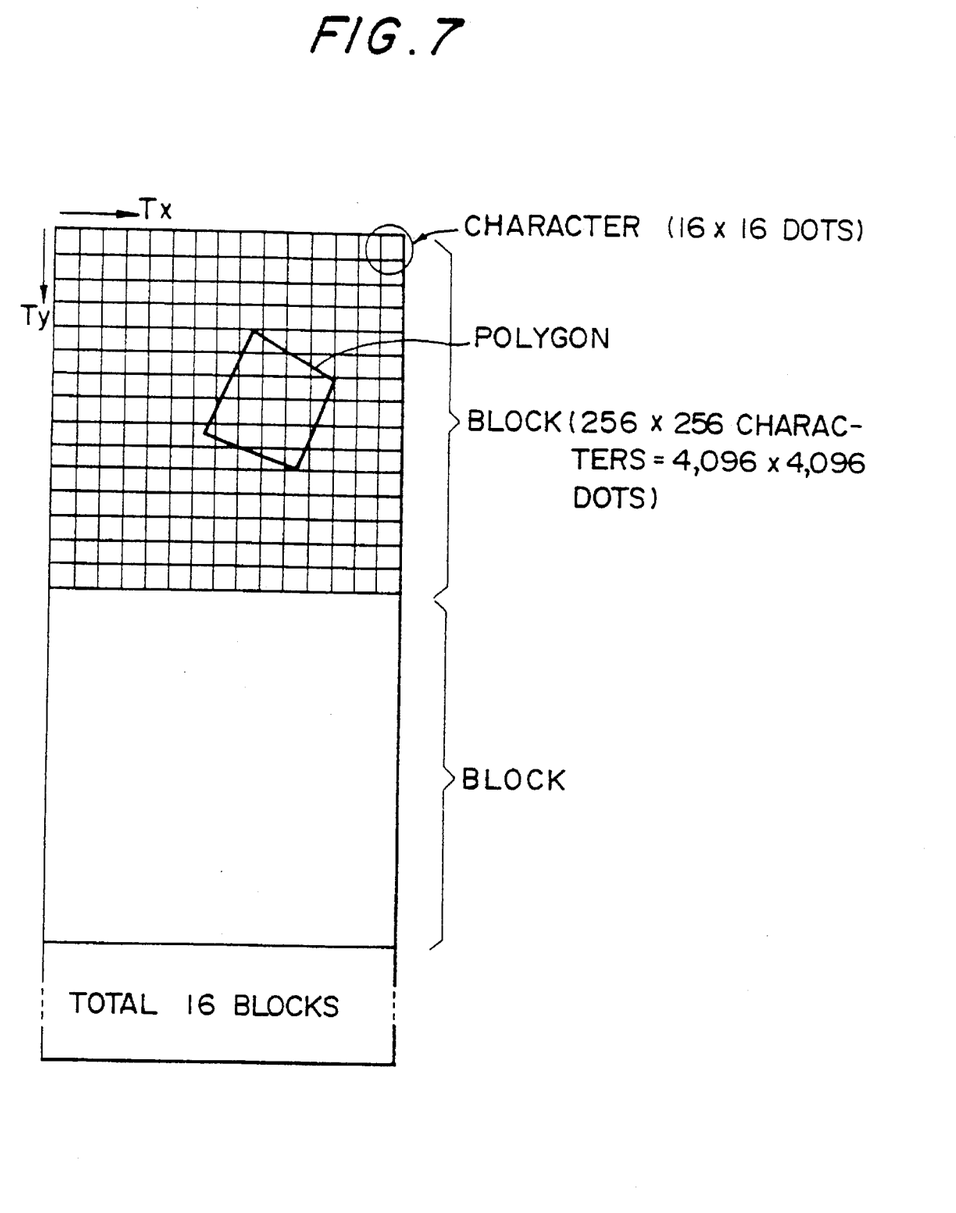
FIG. 7 is a view illustrating a texture information storage unit used in the image synthesizing system of the embodiment.

FIG. 7 schematically shows the texture storage plane of the texture information storage unit 32. The texture storage plane is divided into a plurality of blocks each of which is divided into 256×256 characters. Each of the characters is further divided into 16×16 dot pixels and stores a picture element used to form the texture storage plane.

The texturing to each polygon is accomplished by specifying the coordinates TX and TY of each texture information which is to be applied to a polygon. However, a polygon spanning between adjacent blocks cannot be specified.

Figure 8A:
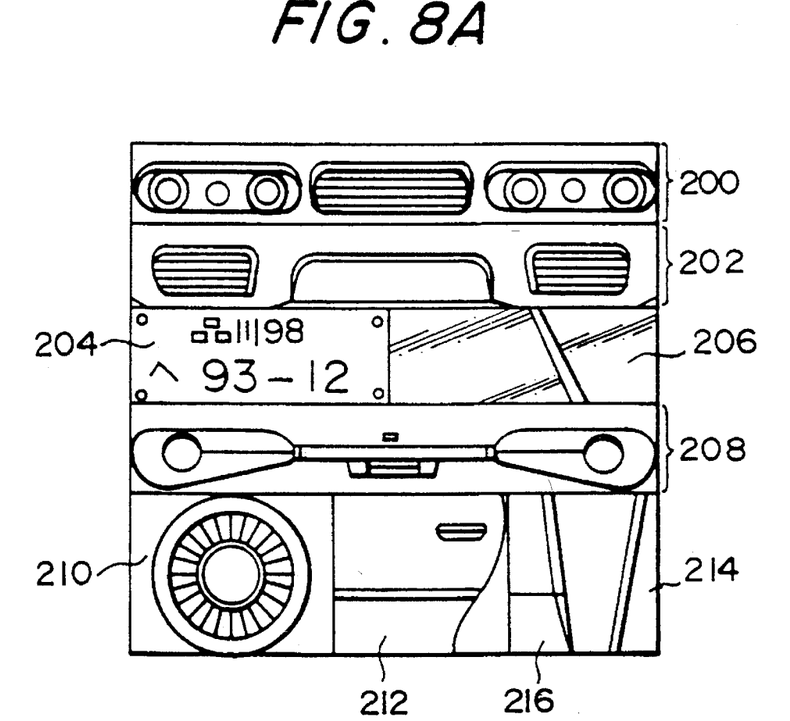
FIGS. 8A, 8B and 8C illustrate the details of texture information stored in the image synthesizing system of the embodiment.
Figure 8B:
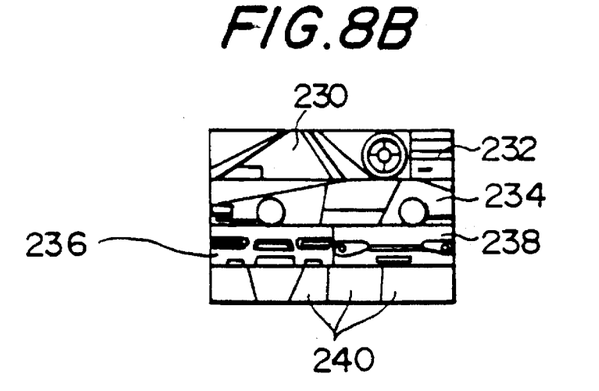
Figure 8C:
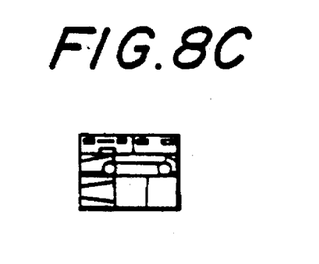

FIG. 8 shows the details of the racing car texture information which is stored in the texture information storage unit 32 of such a structure. FIG. 8A shows the texture information to be applied to the respective polygons for forming the close-up shape model shown in FIG. 4A; FIG. 8B shows the texture information to be applied to the respective polygons for forming the middle-range shape model; and FIG. 8C shows the texture information to be applied to the respective polygons for forming the long-shot shape model.

The texture information shown in FIG. 8A is formed to represent parts corresponding to the respective polygons in the close-up shape model. The texture information 200, 202, 204, 206, 208, 210, 212, 214 and 216 is stored to represent front mask and winkers, tail end, number plate, opposite side windows, rear lamps, road wheels, doors and painted panels and so on, respectively.

In the middle-range texture information shown in FIG. 8B, the texture information 230, 232, 234, 236, 238 and 240 represent side windows, windshield, side view, front view, rear view and painted panels and so on, respectively.

The long-shot texture information shown in FIG. 8C is formed in a manner similar to those of FIGS. 8A and 8B.

Figure 9A:
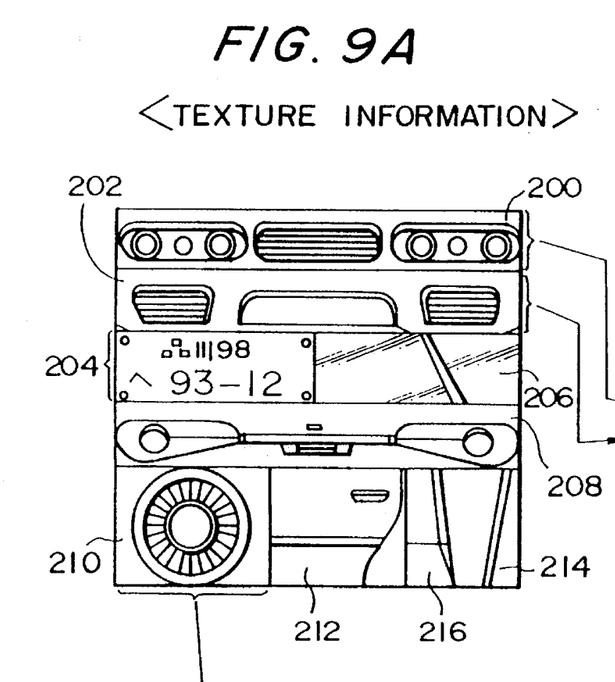
FIGS. 9A and 9B illustrate the relationship between texture information used in a close-up model and positions of the model on which the texture information is applied.
Figure 9B:
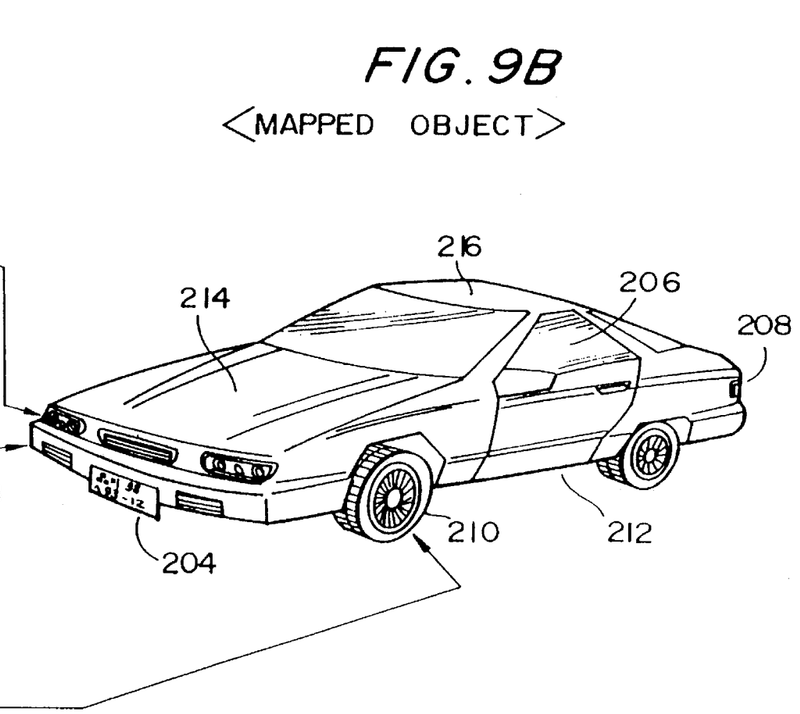
Figure 10:
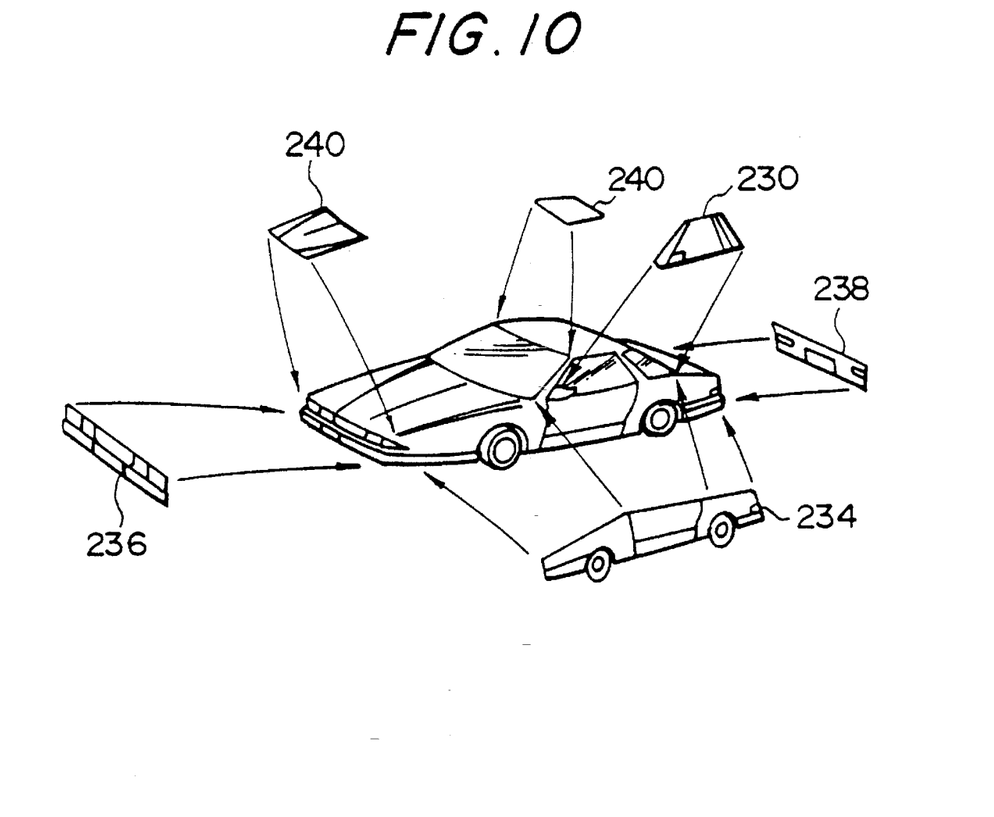
FIG. 10 illustrates the relationship between middle-range texture information and a shape model on which the texture information is applied.
Figure 11:
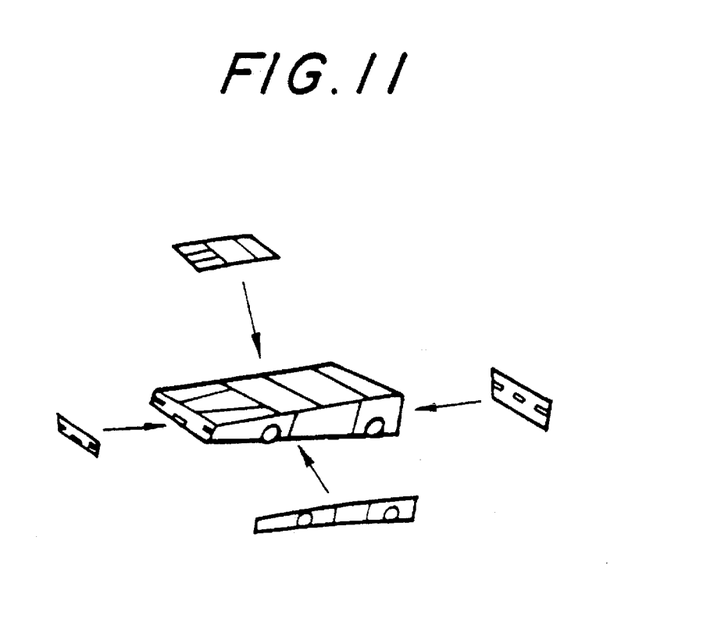
FIG. 11 illustrates the relationship between long-shot texture information and a shape mode 1 on which the texture information is applied.

FIG. 9 shows the relationship between the close-up texture information and the racing car formed by applying this texture information. FIGS. 10 and 11 respectively show the relationships between the middle-range and long-shot texture information and the racing cars formed by applying these texture information.

As shown in FIG. 5, the area which the 3-D object occupies on the display 40 progressively decreases as the 3-D object moves farther from the view point. Thus, the texture information used therein can be of progressively reduced resolution. This embodiment reduces the amount of data to be processed and saves the memory area by displaying highly resolute 3-D objects in the close-up mode and low resolute 3-D objects in the middle-range and long-shot modes, as shown in FIG. 8.

In addition, this embodiment does not form all the close-up texture information shown in FIG. 8A as data of the same resolution, but only forms the texture information representing parts requiring high resolution as high resolution data when the racing car is partially enlarged and displayed as shown in FIG. 6B. In other words, as shown in FIG. 8A, the close-up texture information provides larger highly resolute graphics to the enlarged part and finely drawn parts of the racing car. Other parts are formed as texture information representing smaller graphics of lower resolution. These texture information are stored in the texture information storage unit 32. Thus, the 3-D objects can be displayed with high resolution while further saving the memory required by the texture information storage unit 32.

Among the polygons forming the middle-range and long-shot shape models, any polygon requiring high resolution may be formed as highly resolute texture information, if desired.

The image forming unit 34 is responsive to the image information of 3-D object input from the 3-D calculation unit 22 through the sorting unit 28 for reading texture information corresponding to the respective polygons of the perspectively projected 3-D object from the texture information storage unit 32, and for mapping them on the polygons to form an image to be displayed on the display 40.

The texture mapping in the image forming unit 34 will be described in more detail.

The image forming unit 34 calculates the outline and internal image information of each polygon from its vertex image information which is input into the image forming unit 34 from the 3-D calculation unit 22 through the sorting unit 28. In other words, the 3-D calculation unit 22 and the sorting unit 28 must perform various complicated calculations such as coordinate transformations including rotation, translation and others, clipping, sorting and so on. To reduce the burden on the hardware, all the calculations are made for every polygon and for every vertex. The outline and internal image information of the polygons required to perform the actual image display are formed by the image forming unit 34.

At this point, the image forming unit 34 determines texture coordinates TX and TY used as texture information reading addresses from the respective vertex texture coordinates VTX and VTY to be input for all the dots in each polygons. These texture coordinates TX and TY are used to address the corresponding texture information in the texture information storage unit 32, the read texture information being then mapped to synthesize and display an image of 3-D object on the display 40. Such an image synthesizing technique through the texture mapping is proposed in Japanese Patent Application No. 4-252139 filed by the applicant.

FIG. 5 shows the details of scenes which are displayed on the display 40 through the image synthesizing system of this embodiment. FIG. 5A shows a racing car located at the close range from the view point; FIG. 5B shows the same racing car located at the middle range; and FIG. 5C shows the same racing car located at the long range. Each of the racing car images shown in FIGS. 5A, 5B and 5C is formed by mapping such texture information as shown in FIGS. 8A, 8B and 8C onto the polygons of such shape models as shown in FIGS. 4A, 4B and 4C, respectively, as shown in FIGS. 9, 10 and 11.

The image synthesizing system of this embodiment uses such a highly precise shape model as shown in FIG. 4A when the racing car is displayed in the close-up mode as shown in FIG. 5A and applies such highly resolute texture information as shown in FIG. 8A to the shape model to perform the image synthesis. Therefore, the resulting image of the racing car is extremely realistic and clear.

When the close-up racing car is partially enlarged and displayed as shown in FIG. 6B, its number plate, front view and other parts can be displayed with improved quality since they are formed from the highly resolute texture information compare to the other parts.

In addition, when the racing car is displayed in the long-range modes as shown in FIGS. 5B and 5C, the image is formed and displayed by such relatively simple shape models as shown in FIGS. 4B and 4C and yet by using such texture information of lower resolutions as shown in FIGS. 8B and 8C since the area of the racing car occupying the display may be small. Thus, the number of calculation steps in the hardware can be reduced while saving the memory area.

According to the image synthesizing system of this embodiment, the number of polygons used as well as the memory area required by the texture information storage unit may be saved while representing any moving object such as car realistically.

The present invention is not limited to the aforementioned embodiment, but may be applied in any one of various modifications and changes within the scope of the invention.

For example, the texture in-formation exclusive to the shape model of different degrees of precision may be replaced by texture information shared by some of the polygons in the respective shape models.

Although the embodiment of the present invention is described as to the image synthesizing system used in the game playing apparatus, the present invention may be similarly applied to 3-D image generating simulators and other simulators.

The texture information mapping to the polygons may be replaced by any other mapping techniques, if necessary.

Although the embodiment is described as to the display of a single 3-D object (racing car in this embodiment) through the technique of the present invention, the present invention may be applied to synthesize and display a plurality of 3-D objects on the display through the same technique.

As described, the present invention is effective to provide a high-resolution and real-time display type image synthesizing system and a game playing apparatus using an image synthesizing system which can display the 3-D objects continuously changing in orientation and distance while reducing the burden on the hardware.

When the image synthesizing system of the present invention is used in a game playing apparatus, various moving 3-D objects can be displayed effectively so as to provide improved dramatic scenes.

I claim:

1. An image synthesizing system comprising:

3-D space processing means for perspectively projecting a 3-D object onto a projection plane of a view point coordinate system from a view point, the 3-D object representing a shape model of a plurality of shape models, the shape model being formed by a combination of polygons in a virtual 3-D space;

texture information storage means for previously storing texture information relating to images on the polygons of said 3-D object; and image forming means coupled to the 3-D space processing means and the texture information storage means for reading said texture information corresponding to the polygons of said perspectively projected 3-D object from said texture information storage means by mapping said texture information onto the polygons for forming and displaying an image on a display, said 3-D space processing means comprising:

an object data storage unit for storing object data of said 3-D object, said object data being represented by the plurality of shape models having different degrees of precision;

an object data reading unit coupled to said object data storage unit for selecting a series of said object data of increasing degrees of precision as said 3-D object and said view point draw closer to each other, and for reading said object data from said object data storage unit; and a 3-D calculation unit coupled to said object data reading unit for positioning in the virtual 3-D space the object data read from the object data storage unit and corresponding to said 3-D object, and for perspectively projecting said 3-D object onto the projection plane of the view-point coordinate system, said texture information storage means storing the texture information of each of the polygons, the polygons forming respective members of the plurality of shape models based on different degrees of precision of said 3-D object, and said image forming means for reading from said texture information storage means the texture information of the polygons forming the shape model of the plurality of shape models, the shape model having a precision corresponding to the polygons of said perspectively projected 3-D object, said image forming means synthesizing the image to be displayed by mapping said texture information onto the polygons.

2. An image synthesizing system as defined in claim 1, wherein said texture information storage means stores highly resolute texture information for the polygons in an image part requiring high resolution and a high precision shape model.

3. An image synthesizing system as defined in claim 1, wherein said texture information storage means stores highly resolute texture information for the polygons in an image part requiring high resolution.

4. An image synthesizing system as defined in claim 1, wherein said object data storage unit forms and stores an image part requiring high resolution for the shape model of high precision as independent polygons, and wherein said texture information storage means stores highly resolute texture information for the polygons in an image part requiring high resolution.

5. An image synthesizing system as defined in claim 1, wherein said object data storage unit stores a predetermined 3-D object as object data represented by the plurality of shape models for close-up, middle-range and long-shot modes, and wherein said texture information storage means stores highly resolute texture information for the polygons in an image part requiring high resolution of a close-up shape model of the plurality of shape models.

6. An image synthesizing system as defined in claim 1, wherein said object data includes vertex texture coordinates for each vertex of the polygons of said shape model, and wherein said image forming means calculates texture coordinates based on the vertex, the texture coordinates being used as texture information read-out addresses for all dots in the polygons, the calculated texture coordinates being used as addresses to read the texture information from said texture information storage means, and the image forming means forming and displaying the image by mapping the texture information read from the texture information storage means onto a corresponding polygon of the polygons.

7. An image synthesizing system as defined in claim 2, wherein said object data includes vertex texture coordinates for each vertex of the polygons of said shape model, and wherein said image forming means calculates texture coordinates based on the vertex, the texture coordinates being used as texture information read-out addresses for all dots in the polygons, the calculated texture coordinates being used as addresses to read the texture information from said texture information storage means, and the image forming means forming and displaying the image by mapping the texture information read from the texture information storage means onto a corresponding one of the polygons.

8. An image synthesizing system as defined in claim 3, wherein said object data includes vertex texture coordinates for each vertex of the polygons of said shape model, and wherein said image forming means calculates texture coordinates based on the vertex the texture coordinates, the texture coordinates being used as texture information read-out addresses for all dots in the polygons, the calculated texture coordinates being used as addresses to read the texture information from said texture information storage means, and the image forming means forming and displaying the image by mapping the texture information read from the texture information storage means onto a corresponding one of the polygons.

9. An image synthesizing system as defined in claim 5, wherein said object data includes vertex texture coordinates for each vertex of the polygons of said shape model, and wherein said image forming means calculates texture coordinates based on the vertex texture coordinates, the texture coordinates being used as texture information read-out addresses for all dots in the polygons, the calculated texture coordinates being used as addresses to read the texture information from said texture information storage means, and the image forming means forming and displaying the image by mapping the texture information read from the texture information storage means onto a corresponding one of the polygons.

10. A game playing apparatus comprising:

a player's control unit; and an image synthesizing system responsive to input signals from said player's control unit and to a given game program for forming and displaying a game image on a display, said image synthesizing system comprising:

3-D space processing means for perspectively projecting a 3-D object onto a projection plane of a view point coordinate system from a viewpoint, the 3-D object representing a shape model of a plurality of shape models formed by a combination of polygons in a virtual 3-D space;

texture information storage means for previously storing texture information relating to images on the polygons of said 3-D object; and image forming means coupled to the 3-D space processing means and the texture information storage means for reading said texture information corresponding to the polygons of said perspectively projected 3-D object from said texture information storage means by mapping the texture information onto the polygons for forming and displaying the game image on the display, said 3-D space processing means comprising:

an object data storage unit for storing object data of said 3-D object, said object data being represented by the plurality of shape models having different degrees of precision;

an object data reading unit coupled to said object data storage unit for selecting a series of said object data of increasing degrees of precision as said 3-D object and said view point draw closer to each other, and for reading said object data from said object data storage unit; and a 3-D calculation unit coupled to said object data reading unit that responds to the input signals from the player's control unit and to the given game program for calculating a predetermined game, for controlling said object data reading unit to read said object data, for positioning in the virtual 3-D space the 3-D object by positioning the object data read from the object storage unit and for perspectively projecting said 3-D object onto the projection plane of the view-point coordinate system, the object data being read from the object data storage unit and corresponding to said 3-D object, said texture information storage means storing the texture information of each of the polygons, the polygons forming respective members of the plurality of shape models based on different degrees of precision of said 3-D object, and said image forming means for reading the texture information from said texture information storage means, the texture information corresponding to the polygons that form the shape model of the plurality of shape models, the shape model having a precision corresponding to the polygons of said perspectively projected 3-D object, said image forming means synthesizing the game image to be displayed by mapping said texture information onto the polygons.

11. A game playing apparatus as defined in claim 10, wherein said texture information storage means stores highly resolute texture information for the polygons in an image part requiring high resolution and a high precision shape model.

12. A game playing apparatus as defined in claim 10, wherein said texture information storage means stores highly resolute texture information for the polygons in an image part requiring high resolution.

13. A game playing apparatus as defined in claim 10, wherein said object data storage unit forms and stores an image part requiring high resolution for a high precision shape model as independent polygons, and wherein said texture information storage means stores highly resolute texture information for the polygons in the image part requiring high resolution.

14. A game playing apparatus as defined in claim 10, wherein said object data storage unit stores a predetermined 3-D object as object data represented by the plurality of shape models for close-up, middle-range and long-shot modes, and wherein said texture information storage means stores highly resolute texture information for the polygons in an image part requiring high resolution of a close-up shape model of the plurality of shape models.

15. A game playing apparatus as defined in claim 10, wherein said object data includes vertex texture coordinates for each vertex of the polygons of said shape model, and wherein said image forming means calculates texture coordinates based on the vertex texture coordinates, the texture coordinates being used as texture information read-out addresses for all dots in the polygons, the calculated texture coordinates being used as addresses to read the texture information from said texture information storage means, and the image forming means forming and displaying the game image by mapping the texture information read from the texture information storage means onto a corresponding one of the polygons.

16. A game playing apparatus as defined in claim 11, wherein said object data includes vertex texture coordinates for each vertex of the polygons of said shape model, and wherein said image forming means calculates texture coordinates based on the vertex texture coordinates, the texture coordinates being used as texture information read-out addresses for all dots in the polygons, the calculated texture coordinates being used as addresses to read the texture information from said texture information storage means, and the image forming means forming and displaying the game image by mapping the texture information read from the texture information storage means onto a corresponding one of the polygons.

17. A game playing apparatus as defined in claim 12, wherein said object data includes vertex texture coordinates for each vertex of the polygons of said shape model, and wherein said image forming means calculates texture coordinates based on the vertex texture coordinates, the texture coordinates being used as texture information read-out addresses for all dots in the polygons, the calculated texture coordinates being used as addresses to read the texture information from said texture information storage means, and the image forming means forming and displaying the game image by mapping the texture information read from the texture information storage means onto a corresponding one of the polygons.

18. A game playing apparatus as defined in claim 14, wherein said object data includes vertex texture coordinates for each vertex of the polygons of said shape model, and wherein said image forming means calculates texture coordinates based on the vertex texture coordinates, the texture coordinates being used as texture information read-out addresses for all dots in the polygons, the calculated texture coordinates being used as addresses to read the texture information from said texture information storage means, and the image forming means forming and displaying the game image by mapping the texture information read from the texture information storage means onto a corresponding one of the polygons.

* * * * *